(12) United States Patent
Fan et al.

(10) Patent No.: US 12,141,105 B2
(45) Date of Patent: Nov. 12, 2024

(54) DATA PLACEMENT SELECTION AMONG STORAGE DEVICES ASSOCIATED WITH NODES OF A DISTRIBUTED FILE SYSTEM CLUSTER

(71) Applicant: Dell Products L.P., Round Rock, TX (US)

(72) Inventors: Huijuan Fan, Chengdu (CN); Chi Chen, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 318 days.

(21) Appl. No.: 17/575,803

(22) Filed: Jan. 14, 2022

(65) Prior Publication Data

US 2023/0214364 A1 Jul. 6, 2023

(30) Foreign Application Priority Data

Dec. 31, 2021 (CN) .......................... 202111680907.3

(51) Int. Cl.
G06F 16/18 (2019.01)
G06F 16/13 (2019.01)
G06F 16/182 (2019.01)

(52) U.S. Cl.
CPC .......... G06F 16/183 (2019.01); G06F 16/134 (2019.01)

(58) Field of Classification Search
CPC .......................... G06F 16/134; G06F 16/183
USPC .......................................................... 707/827
See application file for complete search history.

(56) References Cited

U.S. PATENT DOCUMENTS

2018/0260398 A1* 9/2018 Faibish ................. G06F 16/122
2020/0019621 A1* 1/2020 Jha ....................... G06F 16/1734

OTHER PUBLICATIONS

NVM Express, "NVM Express, Revision 1.3," NVM Express, May 1, 2017, 282 pages.
G. Liu et al., "Computing Load Aware and Long-View Load Balancing for Cluster Storage Systems," 2015 IEEE International Conference on Big Data, Oct. 29-Nov. 1, 2015, pp. 174-183.
D. Kunkle et al., "A Load Balancing Framework for Clustered Storage Systems," Proceedings of the 15th International Conference on High Performance Computing, Dec. 2008, pp. 57-72.
(Continued)

*Primary Examiner* — Hosain T Alam
*Assistant Examiner* — Tracy M McGhee
(74) *Attorney, Agent, or Firm* — Ryan, Mason & Lewis, LLP

(57) ABSTRACT

An apparatus comprises a processing device configured to receive, at a given node of a distributed file system cluster, a request to store one or more portions of data and to monitor performance parameters for each storage device associated with the given node, the performance parameters comprising a first performance parameter characterizing data access frequency and at least a second performance parameter characterizing available space. The processing device is also configured to determine an overall performance metric for each of the storage devices associated with the given node based at least in part on the monitored performance parameters and to select, based at least in part on the overall performance metrics, at least one of the storage devices associated with the given node on which to store the one or more portions of data.

20 Claims, 14 Drawing Sheets

(56) References Cited

OTHER PUBLICATIONS

G.-W. You et al., "Scalable Load Balancing in Cluster Storage Systems," International Conference on Distributed Systems Platforms and Open Distributed Processing, Dec. 12, 2011, pp. 101-122.
D. Borthakur, "HDFS Architecture Guide," https://hadoop.apache.org/docs/r1.2.1/hdfs_design.html, Oct. 10, 2020, 8 pages.
The Apache Software Foundation, "#HDFS-1804," https://issues.apache.org/jira/si/jira.issueviews:issue-html/HDFS-1804/HDFS-1804.html, Accessed Nov. 16, 2021, 6 pages.

* cited by examiner

DATA PLACEMENT SELECTION AMONG STORAGE DEVICES ASSOCIATED WITH NODES OF A DISTRIBUTED FILE SYSTEM CLUSTER

RELATED APPLICATION

The present application claims priority to Chinese Patent Application No. 202111680907.3, filed on Dec. 31, 2021 and entitled "Data Placement Selection Among Storage Devices Associated with Nodes of a Distributed File System Cluster," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for data placement selection among storage devices associated with nodes of a distributed file system cluster.

In one embodiment, an apparatus comprises at least one processing device comprising a processor coupled to a memory. The at least one processing device is configured to perform the steps of receiving, at a given one of two or more nodes of a distributed file system cluster, a request to store one or more portions of data and monitoring two or more performance parameters for each of two or more storage devices associated with the given node, the two or more performance parameters comprising a first performance parameter characterizing data access frequency and at least a second performance parameter characterizing available space. The at least one processing device is also configured to perform the steps of determining an overall performance metric for each of the two or more storage devices associated with the given node based at least in part on the monitored two or more performance parameters and selecting, based at least in part on the determined overall performance metrics, at least one of the two or more storage devices associated with the given node on which to store the one or more portions of data. The at least one processing device is further configured to perform the step of storing the one or more portions of data on the selected at least one of the two or more storage devices associated with the given node.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
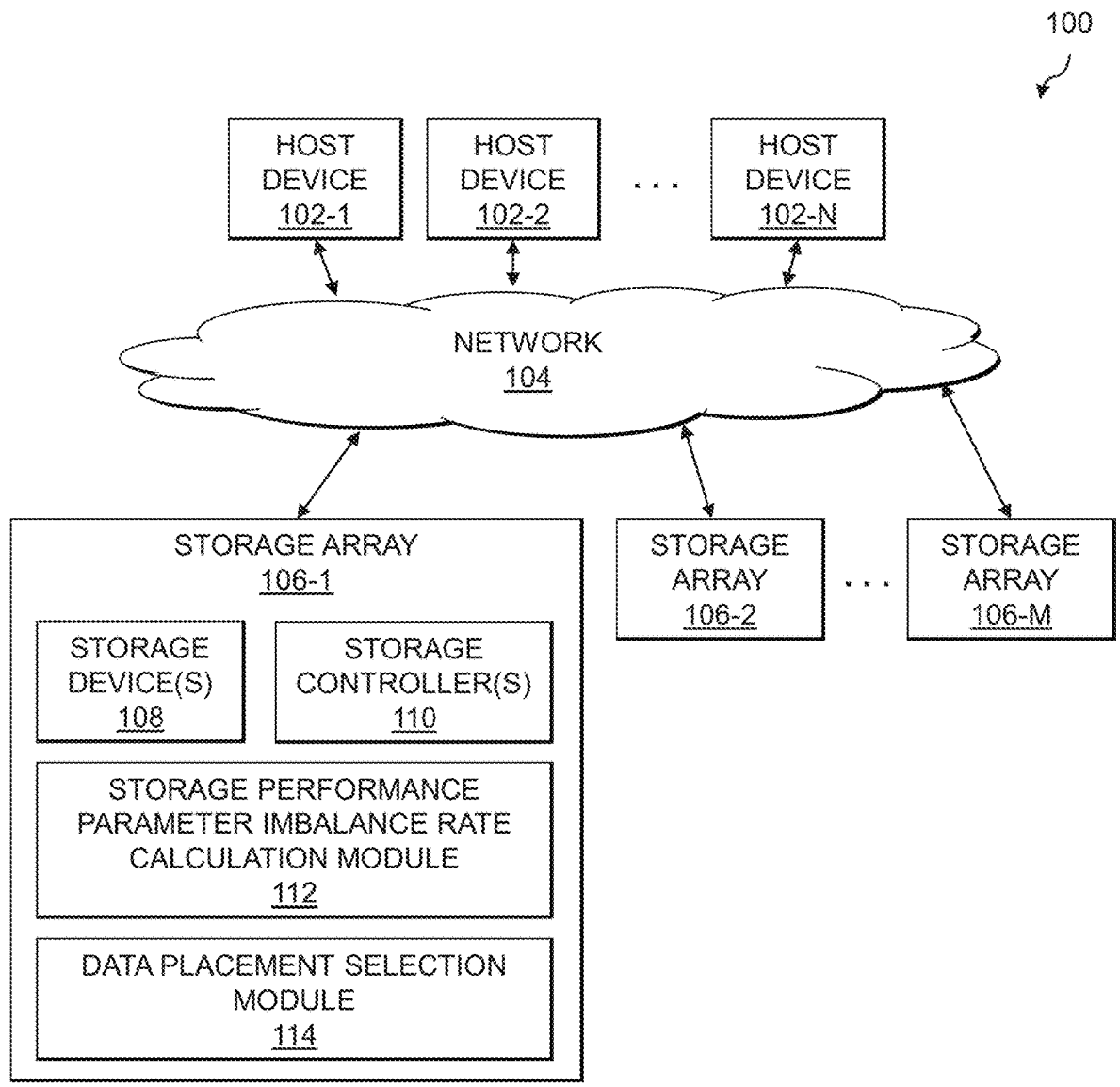
FIG. 1 is a block diagram of an information processing system configured for data placement selection among storage devices associated with nodes of a distributed file system cluster in an illustrative embodiment.

FIG. 1 shows an information processing system 100 configured in accordance with an illustrative embodiment to provide functionality for data placement selection among storage devices associated with nodes of a distributed file system cluster. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system. In some embodiments, the storage arrays 106 may be part of a storage cluster (e.g., where the storage arrays 106 may be used to implement one or more storage nodes in a cluster storage system comprising a plurality of storage nodes interconnected by one or more networks), and the host devices 102 are assumed to submit IO operations to be processed by the storage cluster.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

At least one of the storage controllers of the storage arrays 106 (e.g., the storage controller 110 of storage array 106-1) is assumed to implement functionality for data placement selection among the storage devices 108 of the storage array 106-1 that provide storage for a distributed file system. Such functionality is provided via a storage performance parameter imbalance rate calculation module 112 and a data placement selection module 114. The storage array 106-1 is assumed to comprise a given one of two or more nodes of a distributed file system cluster, and receives requests to store one or more portions of data in the distributed file system of the distributed file system cluster.

The storage performance parameter imbalance rate calculation module 112 is configured to monitor multiple performance parameters for at least a subset of the storage devices 108 of the storage array 106-1 which provide storage space for the distributed file system of the distributed file system cluster. Such performance parameters may include a first performance parameter characterizing data access frequency (e.g., for data stored on each of the storage devices 108 of the storage array 106-1 providing storage space for the distributed file system of the distributed file system cluster) and at least a second performance parameter characterizing available space (e.g., of each of the storage devices 108 of the storage array 106-1 providing storage space for the distributed file system of the distributed file system cluster). The storage performance parameter imbalance rate calculation module 112 is configured to determine an overall performance metric for each of the two or more storage devices associated with the given node based at least in part on the monitored performance parameter. The overall performance metrics illustratively characterize a combination of load and used space percentage of the storage devices 108 of the storage array 106-1 providing storage space for the distributed file system of the distributed file system cluster. Differences in values of the overall performance metrics indicate imbalance rates therebetween. Such imbalance rates may be further broken down for each parameter.

The data placement selection module 114 is configured to select, based at least in part on the determined overall performance metrics, at least one of the storage devices 108 of the storage array 106-1 providing storage space for the distributed file system of the distributed file system cluster on which to store different portions of data. Such selections are illustratively made to reduce the imbalance rate for the storage devices 108 of the storage array 106-1 providing storage space for the distributed file system of the distributed file system cluster. The storage array 106-1 then stores the different portions of data in accordance with such selections.

In some embodiments, the storage arrays 106 in the FIG. 1 embodiment provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

Although in the FIG. 1 embodiment the storage performance parameter imbalance rate calculation module 112 and the data placement selection module 114 are shown as being implemented internal to the storage array 106-1 and outside the storage controllers 110, in other embodiments one or both of the storage performance parameter imbalance rate calculation module 112 and the data placement selection module 114 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of the storage performance parameter imbalance rate calculation module 112 and the data placement selection module 114.

At least portions of the functionality of the storage performance parameter imbalance rate calculation module 112 and the data placement selection module 114 may be implemented at least in part in the form of software that is stored in memory and executed by a processor.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 10 and 11.

It is to be understood that the particular set of elements shown in FIG. 1 for data placement selection among storage devices associated with nodes of a distributed file system cluster is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for data placement selection among storage devices associated with nodes of a distributed file system cluster will now be described in more detail with reference to the flow diagram of FIG. 2. It is to be understood that this particular process is only an example, and that additional or alternative processes for data placement selection among storage devices associated with nodes of a distributed file system cluster may be used in other embodiments.

In this embodiment, the process includes steps 200 through 208. These steps are assumed to be performed by the storage performance parameter imbalance rate calculation module 112 and the data placement selection module 114. The process begins with step 200, receiving, at a given one of two or more nodes of a distributed file system cluster, a request to store one or more portions of data. The distributed file system cluster may comprise a Hadoop distributed file system, and the given node comprises a data node of the Hadoop distributed file system. The request may be received at the given node from an additional one of the two or more nodes of the distributed file system cluster, the additional node comprising a name node of the Hadoop distributed file system. The one or more portions of data may comprise one or more blocks of data of one or more files stored in a distributed file system of the distributed file system cluster.

Two or more performance parameters are monitored for each of two or more storage devices associated with the given node in step 202. The two or more performance parameters comprise a first performance parameter characterizing data access frequency and at least a second performance parameter characterizing available space. Monitoring the first performance parameter may comprise monitoring access frequency measures for the data stored on each of the two or more storage devices associated with the given node. A given value of the first performance parameter for a given one of the two or more storage devices associated with the given node may comprise a ratio of a given one of the access frequency measures of the given storage device to a sum of the access frequency measures of the two or more storage devices associated with the given node. Monitoring the second performance parameter may comprise monitoring used space percentage measures for each of the two or more storage devices associated with the given node, the used space percentage measure for a given one of the two or more storage devices comprising a ratio of a used space of the given storage device to a total space of the given storage device. A given value of the second performance parameter for the given storage device may comprise a ratio of the used space percentage measure for the given storage device to a sum of the used space percentage measures for the two or more storage devices associated with the given node.

Figure 2:
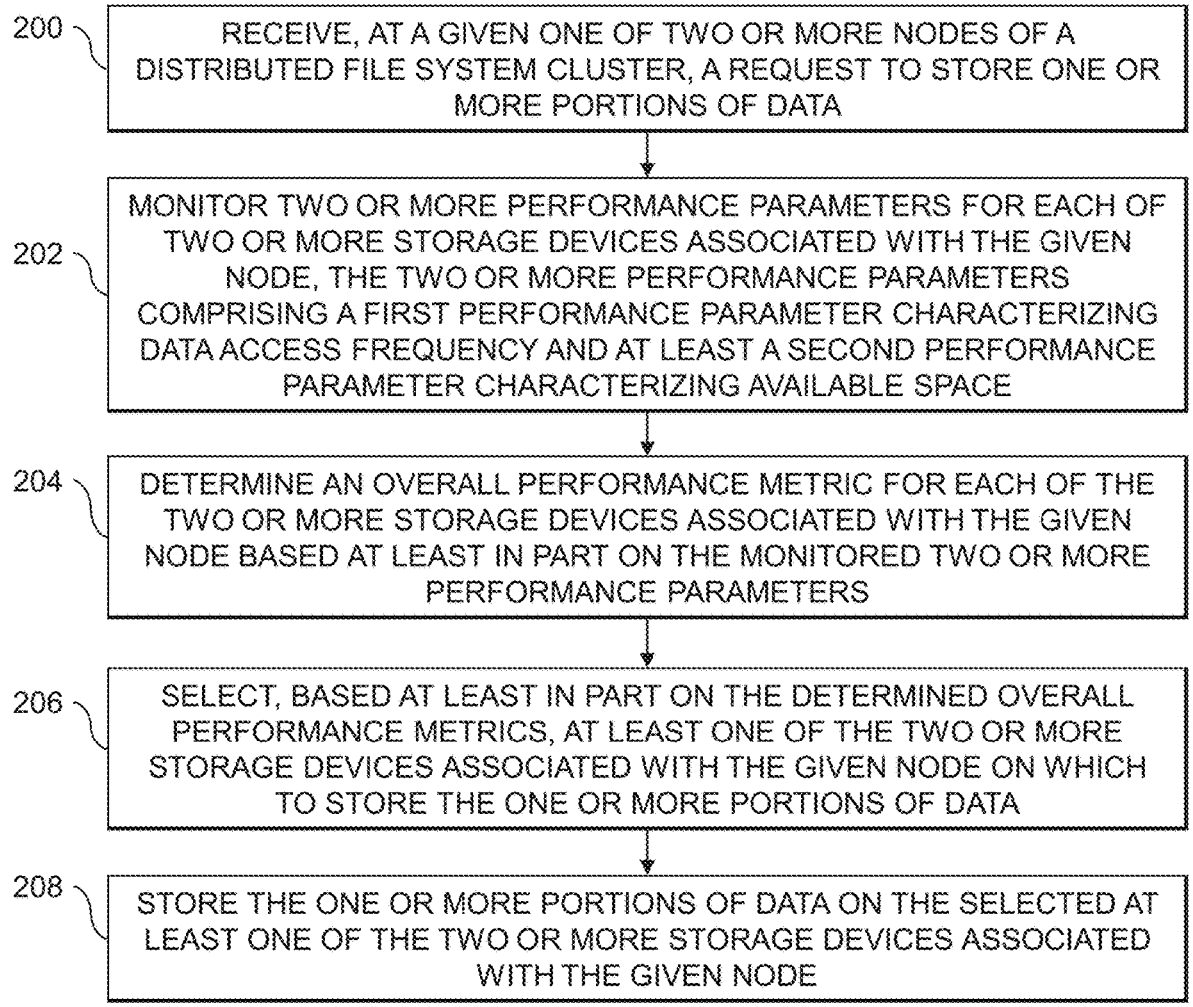
FIG. 2 is a flow diagram of an exemplary process for data placement selection among storage devices associated with nodes of a distributed file system cluster in an illustrative embodiment.

The FIG. 2 process continues with step 204, determining an overall performance metric for each of the two or more storage devices associated with the given node based at least in part on the monitored two or more performance parameters. Determining a given value of the overall performance metric for a given one of the two or more storage devices associated with the given node may comprise computing a weighted sum of values of the two or more performance parameters for the given storage device.

In step 206, at least one of the two or more storage devices associated with the given node on which to store the one or more portions of data is selected based at least in part on the determined overall performance metrics. The one or more portions of data are stored on the selected at least one of the two or more storage devices associated with the given node in step 208. In some embodiments, the request to store one or more portions of data comprises a request to store two or more blocks each having a designated block size. In such embodiments, step 206 may comprise selecting a first one of the two or more storage devices on which to store at least a first one of the two or more blocks and selecting a second one of the two or more storage devices on which to store at least a second one of the two or more blocks. Step 206 may also or alternatively comprise selecting at least a first one of the two or more storage devices associated with the given node on which to store at least a first one of the two or more blocks, updating the overall performance metrics for the two or more storage devices responsive to determining changes in values of the two or more parameters that will result from storage of said at least a first one of the two or more blocks, and selecting, utilizing the updated overall performance metrics, at least a second one of the two or more storage device associated with the given node on which to store at least a second one of the two or more blocks.

In some embodiments, selecting the at least one storage device associated with the given node on which to store the one or more portions of data in step 206 is further based at least in part on reducing at least one imbalance rate associated with the given node. The at least one imbalance rate may comprise a first imbalance rate characterizing differences in values of the first parameter for the two or more storage devices associated with the given node and a second imbalance rate characterizing differences in values of the second parameter for the two or more storage devices associated with the given node, and step 206 may be further based at least in part on reducing the first imbalance rate relative to the second imbalance rate in accordance with weights assigned to the first parameter and the second parameter.

Illustrative embodiments provide techniques for optimal data placement selection policies in storage systems. In some embodiments, the storage system is assumed to comprise a storage array (also referred to as a data node) that has multiple storage devices (also referred to as disks) where new data may be stored. The optimal data placement policy takes into account both IO temperature and capacity/used space percentage for the multiple disks of the data node. IO temperature as well as the capacity and used space of the different disks of the data node are monitored in real-time to generate overall performance metrics for each of the disks. The overall performance metrics characterize load and space availability of the disks. The most lightly-loaded and space available disk is then selected for incoming data (also referred to as incoming block volumes). In this way, IO load and capacity are intelligently balanced among the different disks of the data node to achieve improved efficiency as compared with existing approaches.

Figure 3:
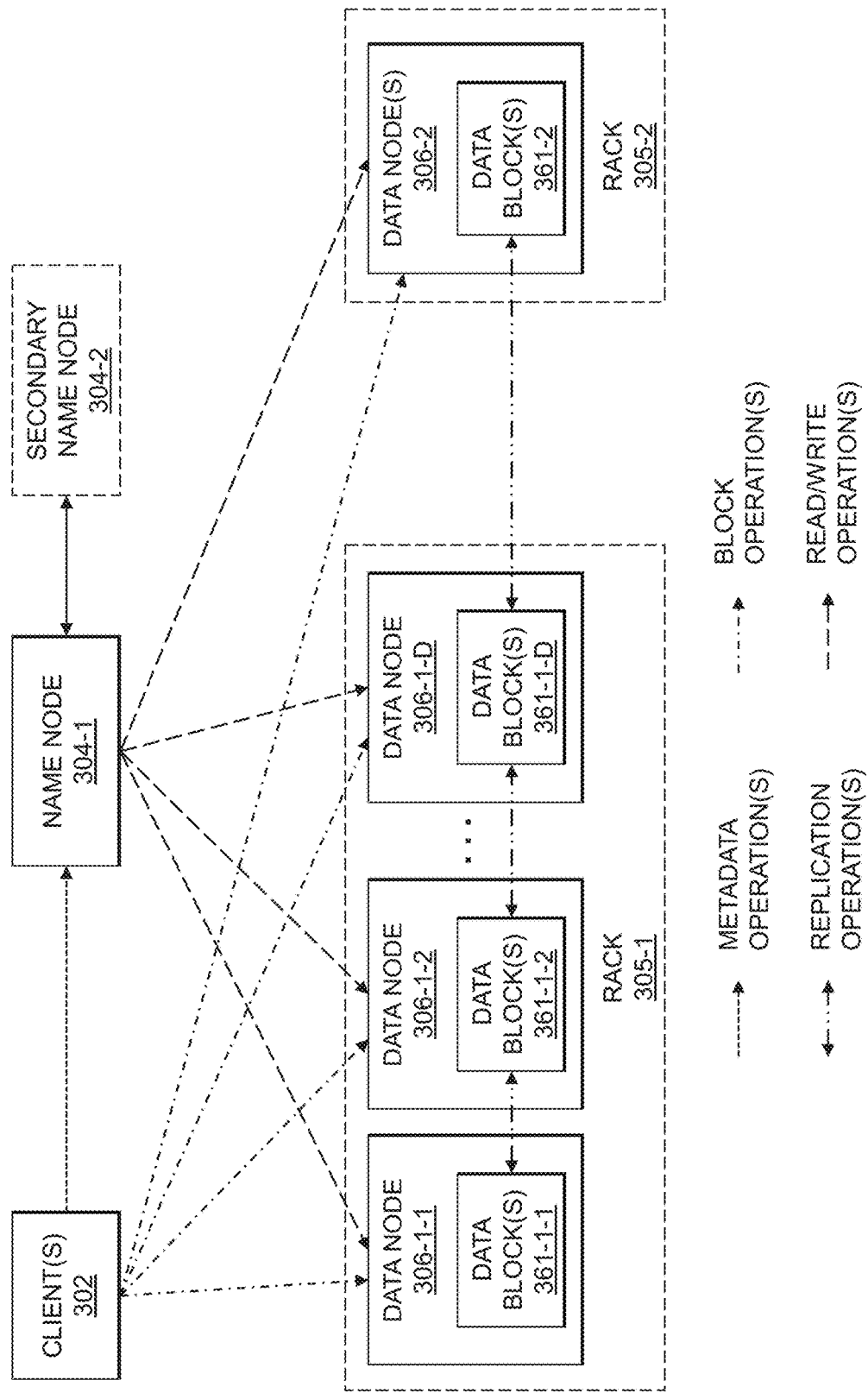
FIG. 3 shows a distributed file system architecture in an illustrative embodiment.

Various embodiments will be described below in the context of an optimal block volume selection policy for a Hadoop Distributed File System (HDFS). FIG. 3 shows an example architecture for a HDFS, which includes one or more clients 302, a name node 304-1, an optional secondary name node 304-2, and multiple data nodes which are separated across multiple equipment racks 305-1 and 305-2 (collectively, racks 305). The rack 305-1 includes data nodes 306-1-1, 306-1-2, . . . 306-1-D (collectively, data nodes 306-1) and the rack 305-2 includes a set of data nodes 306-2. The data nodes 306-1 and 306-2, collectively referred to as data nodes 306, store data blocks. For example, data node 306-1-1 stores data blocks 361-1-1, data node 306-1-2 stores data blocks 361-1-2, data node 306-1-D stores data blocks 361-1-D, and data nodes 306-2 store data blocks 361-2. The data blocks 361-1-1, 361-1-2, . . . 361-1-D are collectively referred to as data blocks 361-1, and the data blocks 361-1 and 361-2 are collectively referred to as data blocks 361.

The HDFS utilizes a master/slave architecture, where the name node 304-1 acts as a "master" that manages a file system namespace and regulates access to files by the clients 302. The optional secondary name node 304-2 is configured to take checkpoints of file system metadata maintained by the name node 304-1. Such checkpoints may include edit logs indicating a sequence of changes made to the file system after the name node 304-1 has started. The secondary name node 304-2 can periodically apply such edit logs to a snapshot of the file system image to create a new file system image that is copied back to the name node 304-1. The name node 304-1 can use the new file system image at its next restart, thereby reducing the time required for restart as the number of file system edits to be merged is reduced (e.g., only those edits that occurred subsequent to the latest copying of the new file system image to the name node 304-1 will need to be merged).

The data nodes 306 each manage a set of disks on which data is stored. HDFS exposes a file system namespace allowing data to be stored in files. Internally, each file is split into one or more blocks with such blocks being stored by the data nodes 306 across the set of disks that it manages. The name node 304-1 manages file system namespace operations (e.g., opening, closing and renaming files and directories), and also determines the mappings of data blocks 361 to different ones of the data nodes 306. The data nodes 306 serve read and write requests from the clients 302. The data nodes perform block creation, deletion and replication (e.g., across different ones of the data nodes 306 within and across different racks 305) as instructed by the name node 304-1. FIG. 3 illustrates how metadata operations are performed between the clients 302 and the name node 304-1, block operations are performed between the name node 304-1 and the data nodes 306, replication operations are performed between the different data nodes 306 and racks 305, and read/write operations are performed between the clients 302 and the data nodes 306.

Figure 4:
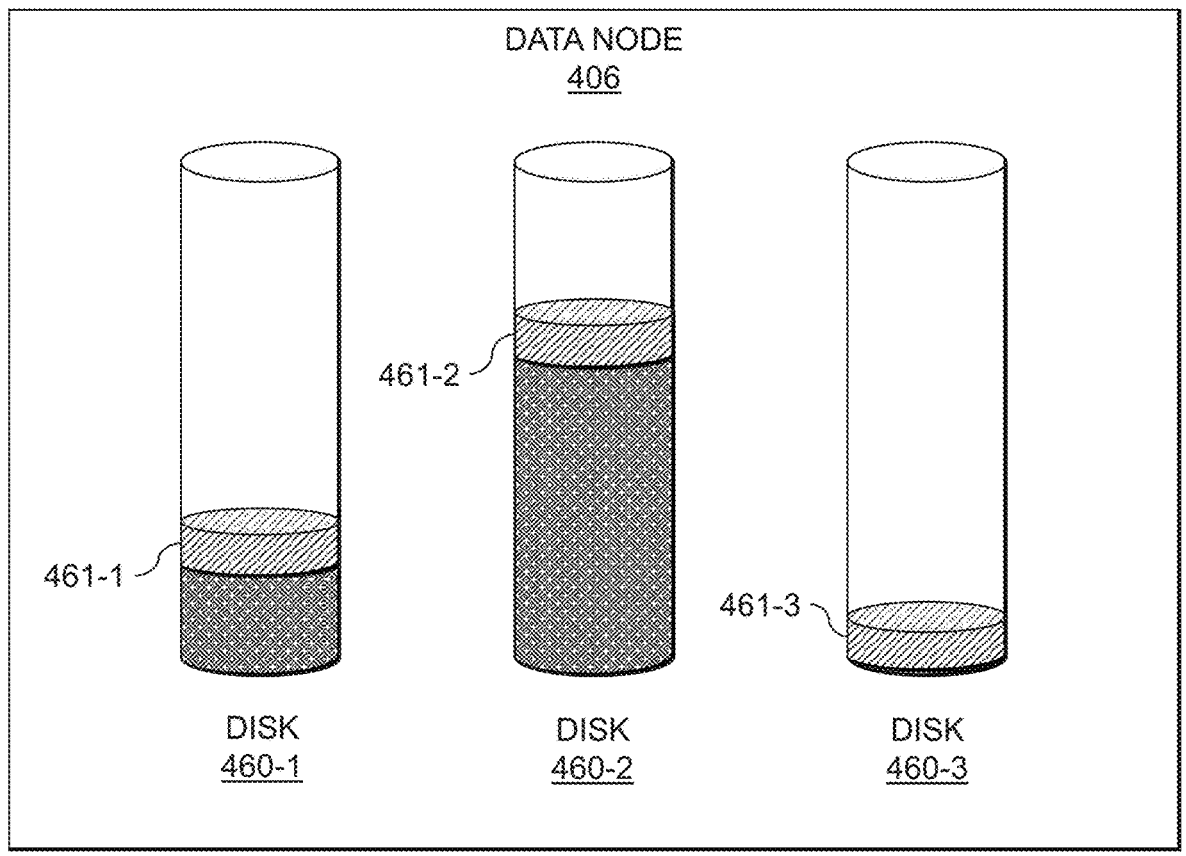
FIG. 4 shows a round-robin selection policy for storage volumes of a data node in an illustrative embodiment.
Figure 5:
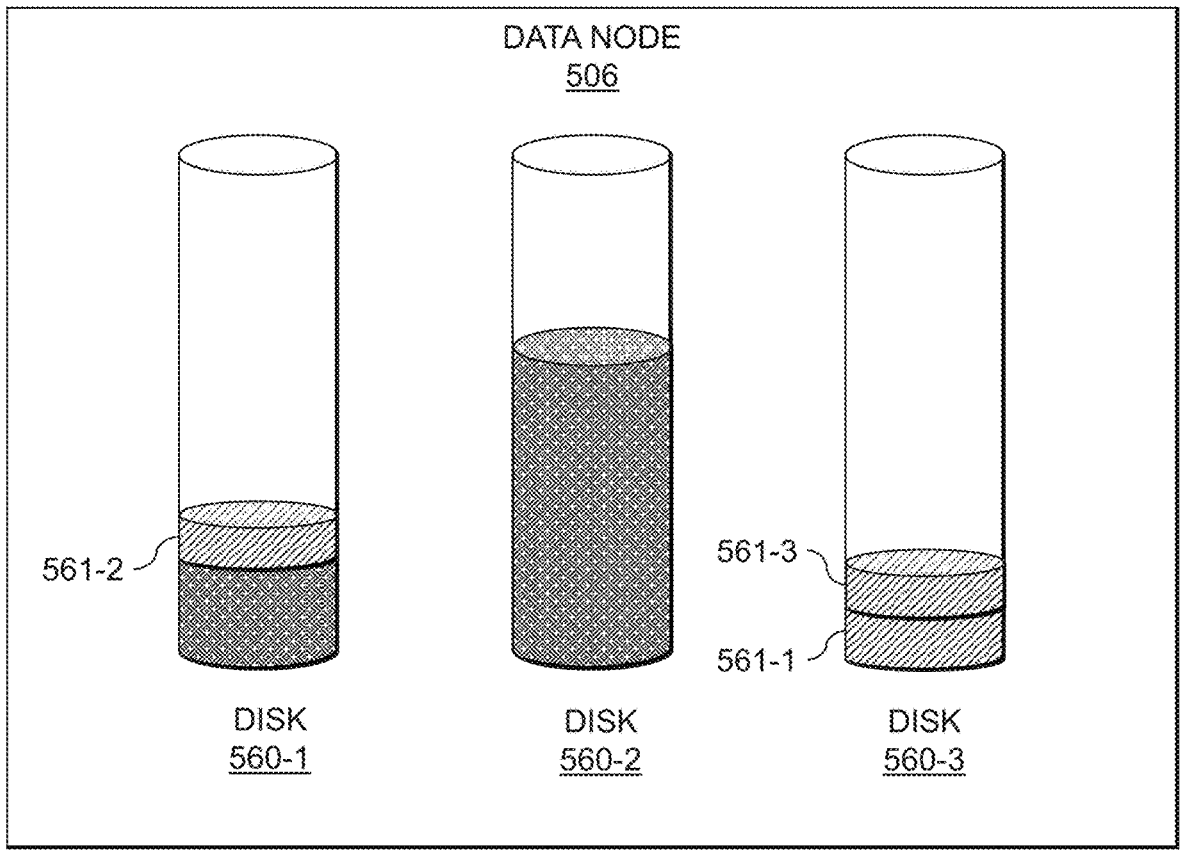
FIG. 5 shows an available space selection policy for storage volumes of a data node in an illustrative embodiment.

Each data node 306 spreads its associated data blocks 361 into local filesystem directories, which can be specified using "dfs.datanode.dara.dir" in a configuration file (e.g., an "hdfs-site.xml" file). In a typical installation, each directory (referred to as a "volume" in HDFS terminology) is on a different device (e.g., a separate HDD or SSD). When writing new blocks to HDFS, the data nodes 306 use a selection policy to choose the disk to be used for each block. Currently supported selection policies include round-robin and available space. The round-robin selection policy distributes new blocks evenly across the available disks, while the available space policy preferentially writes data to the disk that has the freest space (e.g., by percentage). FIG. 4 shows a data node 406 with three disks 460-1, 460-2 and 460-3 (collectively, disks 460), where the data node 406 implements the round-robin selection policy to distribute new blocks 461-1, 461-2 and 461-3 evenly across the disks 460. FIG. 5 shows a data node 506 with three disks 560-1, 560-2 and 560-3 (collectively, disks 560), where the data node 506 implements the available space selection policy to preferentially write new data blocks 561-1, 561-2 and 561-3 to the one of the disks 560 having the freest space (e.g., by percentage).

By default, data nodes in a HDFS architecture utilize the round-robin selection policy for writing new blocks. The round-robin selection policy seeks to evenly distribute new block write load across each disk in the data node. However, in a long-running cluster of data nodes, it is still possible for one or more data nodes to have significantly imbalanced disks due to various events (e.g., massive file deletion in HDFS, the addition of new disks to data nodes via disk hot-swap features, etc.). Such imbalance is illustrated in the example of FIG. 4, where the three disks 460 having the same total capacity have significantly varying amounts of data stored therein. Even if data nodes use the available space selection policy instead, disk imbalances can still lead to less efficient operation (e.g., less efficient disk IO). For example, using the available space selection policy, every new write may go to a newly-added empty disk, while other disks are idle. This creates a bottleneck on the newly-added disk. This type of bottleneck and resulting imbalance is illustrated in the example of FIG. 5.

Using the techniques described herein, an improved data placement selection policy is enabled for HDFS data nodes, where the improved volume selection policy takes into account both disk IO temperature and capacity/used space percentage. The system will monitor real-time IO temperature and used capacity of the disks in a data node to generate overall disk metrics for each of the disks or storage volumes in the data node. The data node then selects the most lightly-loaded and space available disk or storage volume for new data blocks. In this way, the data node can balance the IO load and capacity among the available disks and achieve better performance than the round-robin and available space data placement selection policies.

Let the IO temperature be denoted by T, capacity be denoted by C, and whole or overall disk performance be denoted P. $T_{volume}$ represents the IO temperature of a block volume, and $T_{disk}$ represents the IO temperature of a disk, where:

$$T_{disk} = \sum_{i=1}^{M} T_{volume}$$

M denotes the current volume count in the data node disk. The used space percentage of the disk, $C_{disk}$, may be computed as:

$$C_{disk} = \frac{\text{used size of disk}}{\text{total size of disk}}$$

The whole or overall disk performance, P, is a weighted criterion that combines multiple disk metric criteria. In some embodiments, such disk metric criteria include IO temperature (T) and used space percentage (C). The higher the IO temperature value and used space percentage, the busier the disk (and thus the lower the performance that the disk can provide for incoming IO traffic). The weighted criterion P may be computed as:

$$P = \omega_T * T + \omega_C * C$$

where $\omega_T$ and $\omega_C$ are weights for the IO temperature and available space criteria, respectively, and where $\omega_T + \omega_C = 1$. By tuning the weights $\omega_T$ and $\omega_C$, better overall balancing results may be achieved. While in the example above only two criteria are utilized in calculating P, it should be appreciated that in other embodiments various other criteria may be utilized for calculating P in addition to or in place of the IO temperature and used space percentage criteria.

Figure 6:
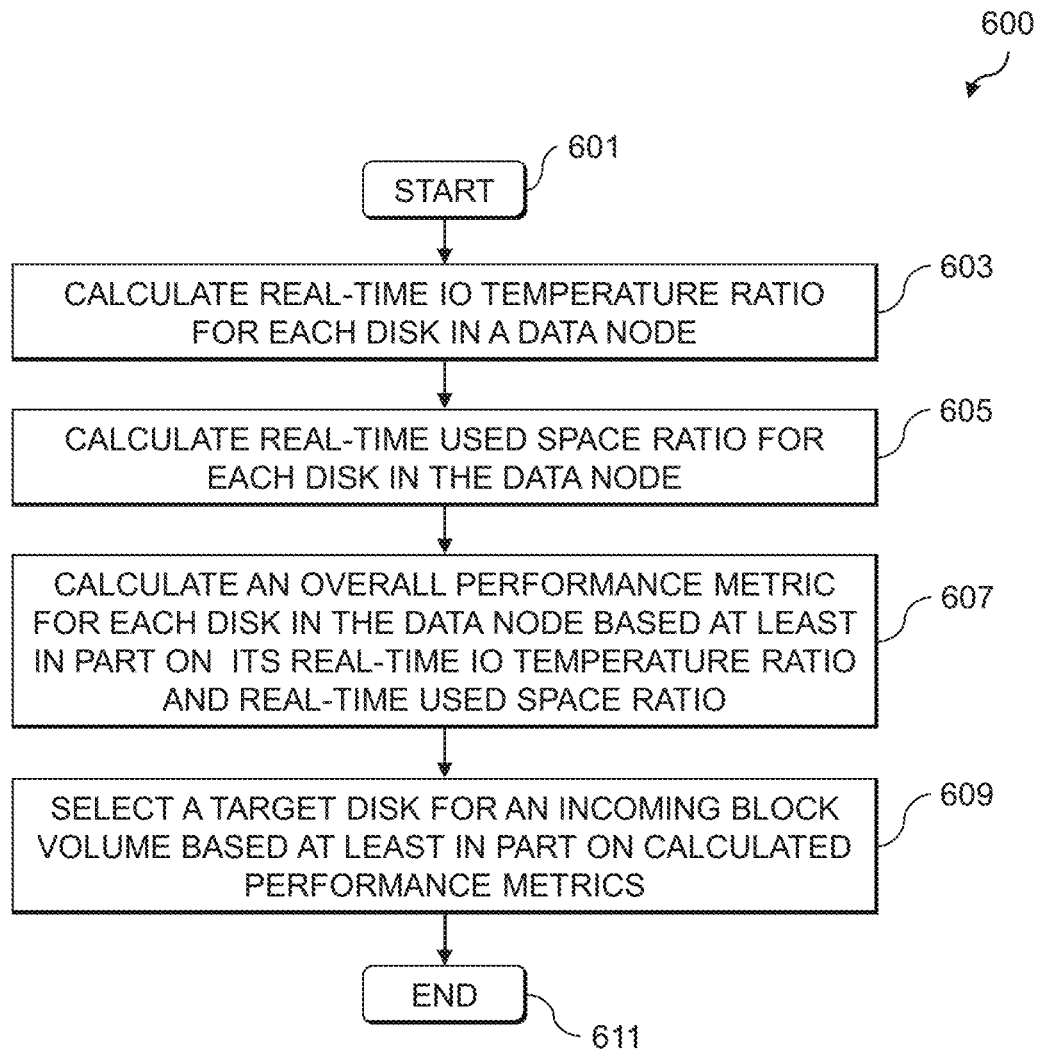
FIG. 6 shows a process flow for storage volume selection based on real-time input-output temperature and used space ratios in an illustrative embodiment.

Based on the weighted criterion P, an optimal block volume selection policy algorithm is implemented as shown in the process flow 600 of FIG. 6. The process flow 600 starts in step 601 when a new block volume is writing into HDFS for a particular data node and the data node must select which disk to place the new block volume on. In step 603, each disks' real-time IO temperature ratio is calculated according to the following equation:

$$\frac{T_{Diski}}{\sum_{j=1}^{N} T_{Diskj}}$$

where N is the number of disks in the data node.

In step 605, each disk's real-time used space ratio is calculated according to the following equation:

$$\frac{C_{Diski}}{\sum_{j=1}^{N} C_{Diskj}}$$

In step 607, an overall performance metric, $P_{disk}$, is calculated for each disk in the data node based at least in part on the real-time IO temperature ratio and used space ratios calculated for that disk. $P_{disk}$ is calculated for each disk i in the data node according to the following equation:

$$P_{Diski} = \omega_T * \frac{T_{Diski}}{\sum_{j=1}^{N} T_{Diskj}} + \omega_C * \frac{C_{Diski}}{\sum_{j=1}^{N} C_{Diskj}}$$

In step 609, a target disk for the incoming block volume is selected based at least in part on the calculated performance metrics $P_{disk}$. This may include selecting the disk with the minimum $P_{disk}$ value or, if there are multiple disks with the same minimum value, randomly selecting among the multiple disks with the same minimum value. The process flow 600 then ends 611. In some embodiments, the process flow 600 may be repeated for each incoming block volume, so as to obtain updated real-time IO temperature and used space ratios. In other embodiments, the process flow 600 is repeated when previously-calculated real-time IO temperature and used space ratios become outdated (e.g., in accordance with some threshold time).

To effectively measure the performance of the optimal block volume selection policy algorithm illustrated by the process flow 600 of FIG. 6, an IO temperature imbalance rate and used space percentage imbalance rate of the data node are determined. The average IO temperature of the disks in the data node is calculated according to:

$$T_{diskaverage} = \frac{1}{N}\sum_{i=1}^{N}T_{diski}$$

where N is the disk count for the data node. The standard deviation of the IO temperature of the disks in the data node is calculated according to:

$$\sigma = \sqrt{\frac{\sum_{i=1}^{N}(T_{diski} - T_{diskaverage})^2}{N-1}}$$

The standard deviation σ is a measure of how spread out the IO temperature values are. A low standard deviation indicates that the IO temperature of the disks tend to be close to the mean (also referred to as the expected value) of the set, while a high standard deviation value indicates that the values are spread out over a wider range. The IO temperature imbalance rate, TIB, of the data node is calculated according to:

$$TIB = \frac{\sigma}{T_{Diskaverage}} = \frac{\sqrt{\frac{\sum_{i=1}^{N}(T_{Diski} - T_{Diskaverage})^2}{N-1}}}{T_{Diskaverage}}$$

The bigger the value of TIB, the more imbalanced the IO temperatures of the disks of the data node are. The smaller the value of TIB, the more well-balanced the IO temperatures of the disks of the data node are.

The average available space percentage of the disks in the data node is calculated according to:

$$C_{Diskaverage} = \frac{1}{N}\sum_{i=1}^{N}C_{Diski}$$

where N is the disk count for the data node. The standard deviation of the available space percentage of the disks in the data node is calculated according to:

$$\mu = \sqrt{\frac{\sum_{i=1}^{N}(T_{diski} - T_{diskaverage})^2}{N-1}}$$

The standard deviation μ is a measure of how spread out the available space percentage values are. A low standard deviation indicates that the available space percentages of the disks tend to be close to the mean (also referred to as the expected value) of the set, while a high standard deviation value indicates that the values are spread out over a wider range. The used space percentage imbalance rate, CIB, of the data node is calculated according to:

$$CIB = \frac{\mu}{C_{Diskaverage}} = \frac{\sqrt{\frac{\sum_{i=1}^{N}(C_{Diski} - C_{Diskaverage})^2}{N-1}}}{C_{Diskaverage}}$$

The bigger the value of CIB, the more imbalanced the available space percentages of the disks of the data node are. The smaller the value of CIB, the more well-balanced the available space percentages of the disks of the data node are.

Figure 7A:
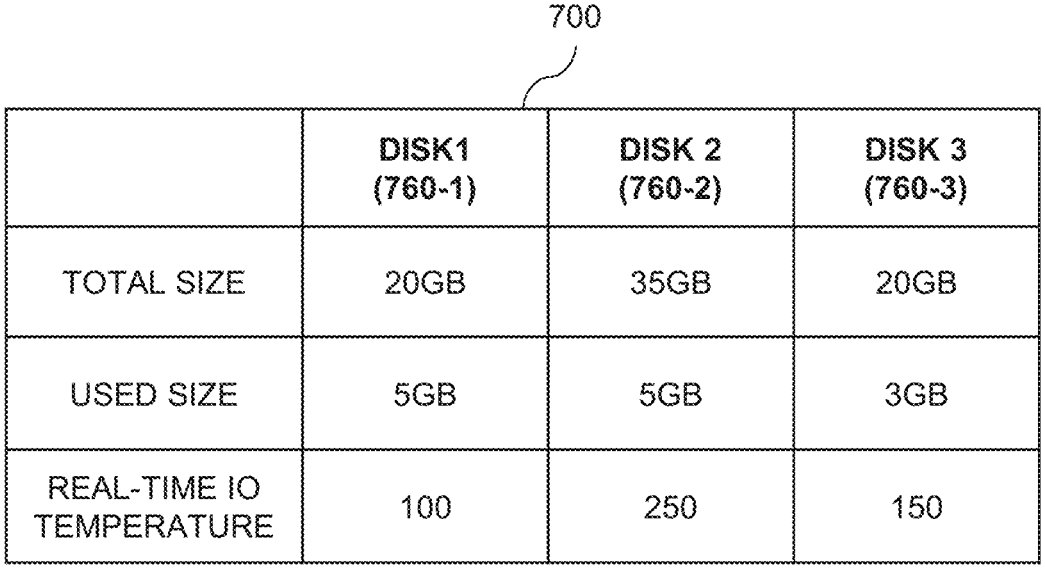
FIG. 7A shows example parameter values for storage volumes of a data node in an illustrative embodiment.
Figure 7B:
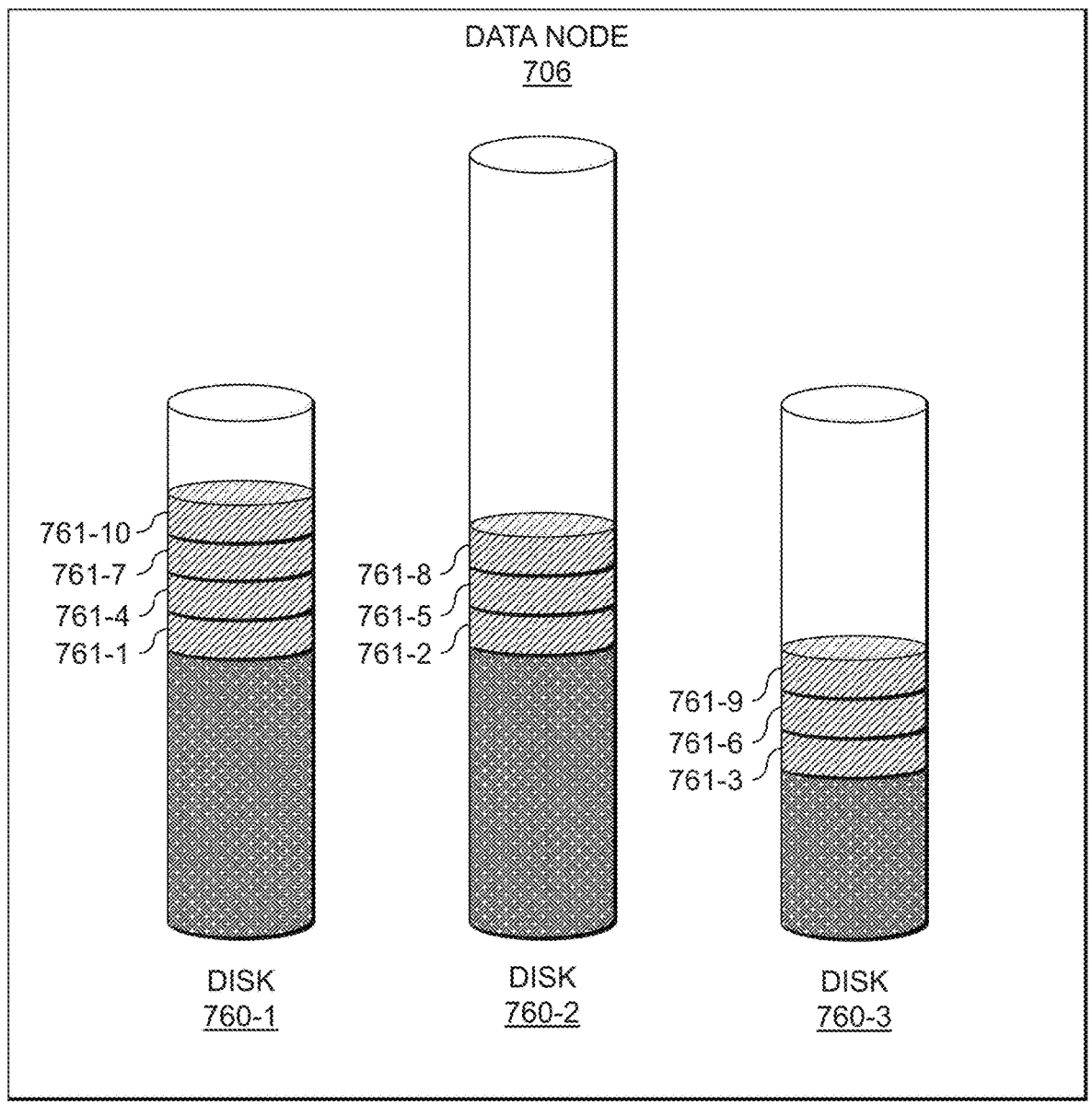
FIG. 7B shows placement of data blocks across storage volumes of a data node with the parameter values of FIG. 7A using a round-robin selection policy in an illustrative embodiment.
Figure 7C:
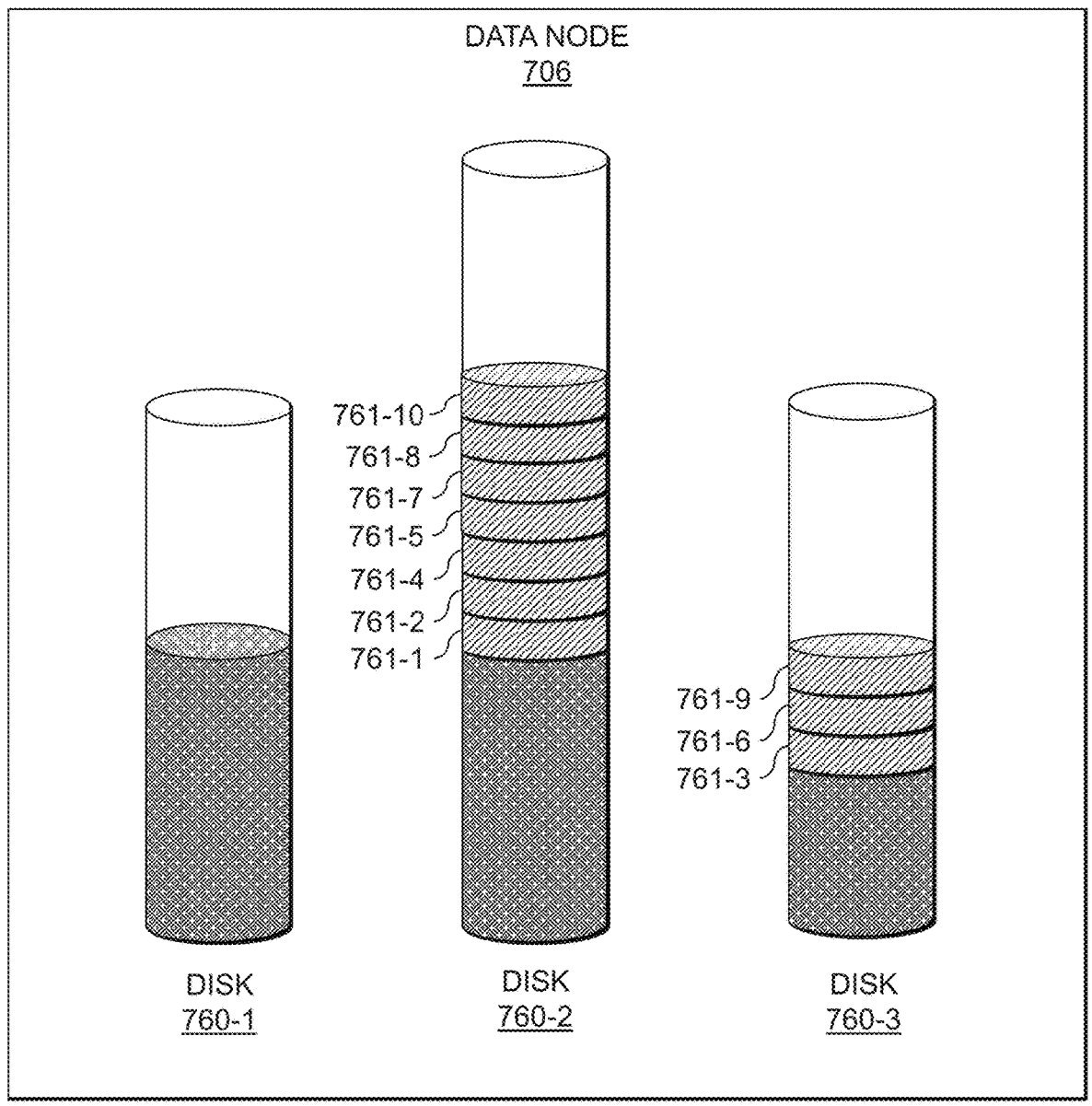
FIG. 7C shows placement of data blocks across storage volumes of a data node with the parameter values of FIG. 7A using an available space selection policy in an illustrative embodiment.
Figure 7D:
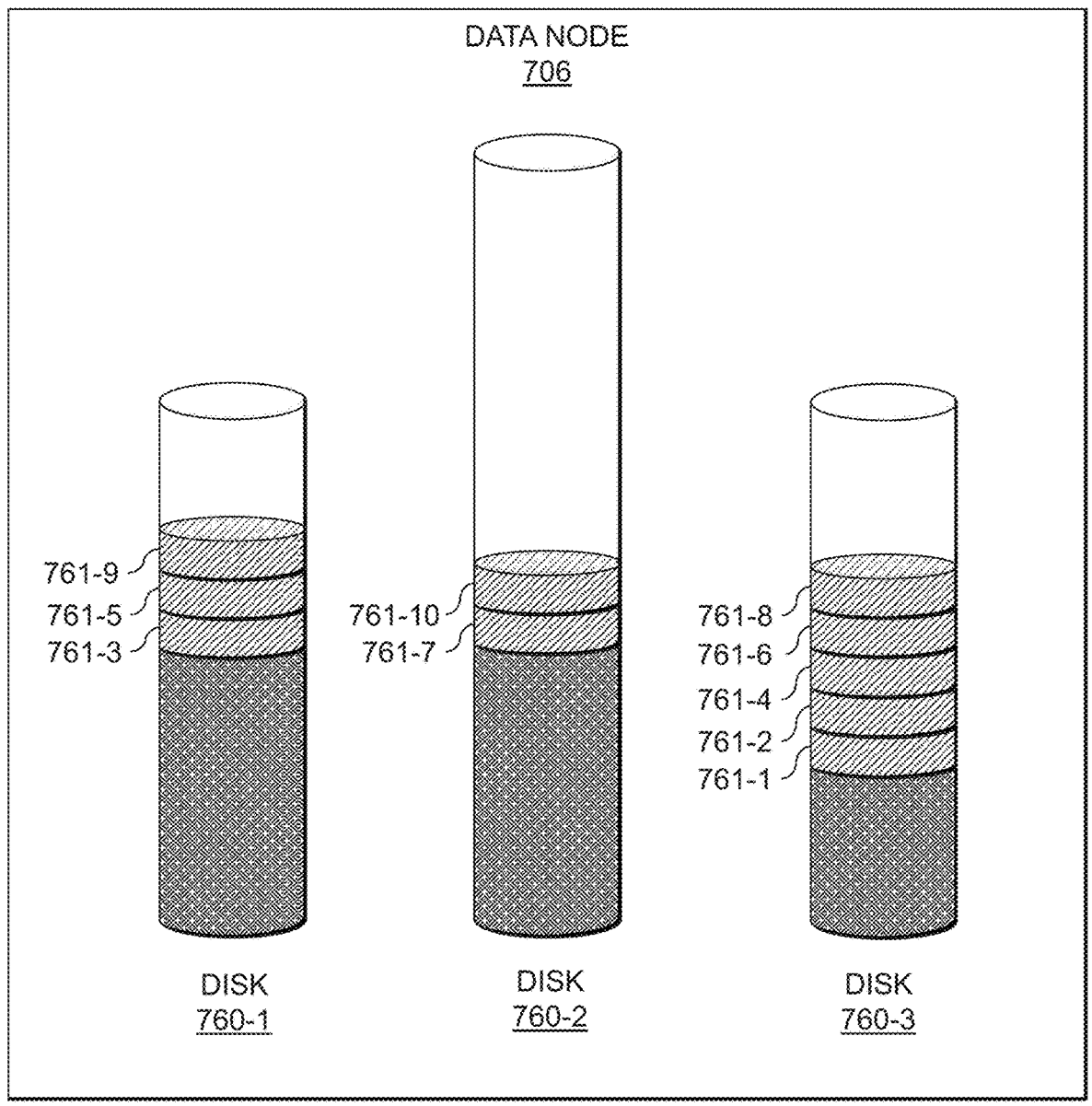
FIG. 7D shows placement of data blocks across storage volumes of a data node with the parameter values of FIG. 7A using a selection policy that takes into account real-time input-output temperature and used space ratios in an illustrative embodiment.

A particular example will now be described with respect to FIGS. 7A-7D, where a data node 706 is assumed to include three disks 760-1, 760-2 and 760-3 (collectively, disks 760). In this example, the block volume size is assumed to be 128 megabytes (MB) and each newly introduced block volume write is assumed to bring 20 units of real-time IO temperature. FIG. 7A shows a table 700 which indicates the total size, used size and real-time IO temperature for the disks 760. The total size and used size are listed in terms of gigabytes (GB). Given the above, assume that there is a large file write request that includes 10 concurrent block volumes (denoted blocks 761-1 through 761-10, collectively blocks 761) that need to be written to the data node 706, and that $\omega_T = \omega_C = 0.5$. FIG. 7B illustrates application of the round-robin selection policy, where blocks 761-1, 761-4, 761-7 and 761-10 are stored on disk 760-1, blocks 761-2, 761-5 and 761-8 are stored on disk 760-2, and blocks 761-3, 761-6 and 761-9 are stored on disk 760-3. FIG. 7C illustrates application of the available space selection policy, where blocks 761-1, 761-2, 761-4, 761-5, 761-7, 761-8 and 761-10 are stored on disk 760-2, and blocks 761-3, 761-6 and 761-9 are stored on disk 760-3. FIG. 7D illustrates application of the optimal data placement selection policy (e.g., the process flow 600 of FIG. 6), where blocks 761-3, 761-5 and 761-9 are stored on disk 760-1, blocks 761-7 and 761-10 are stored on disk 760-2, and blocks 761-1, 761-2, 761-4, 761-6 and 761-8 are stored on disk 760-3.

Figure 8:
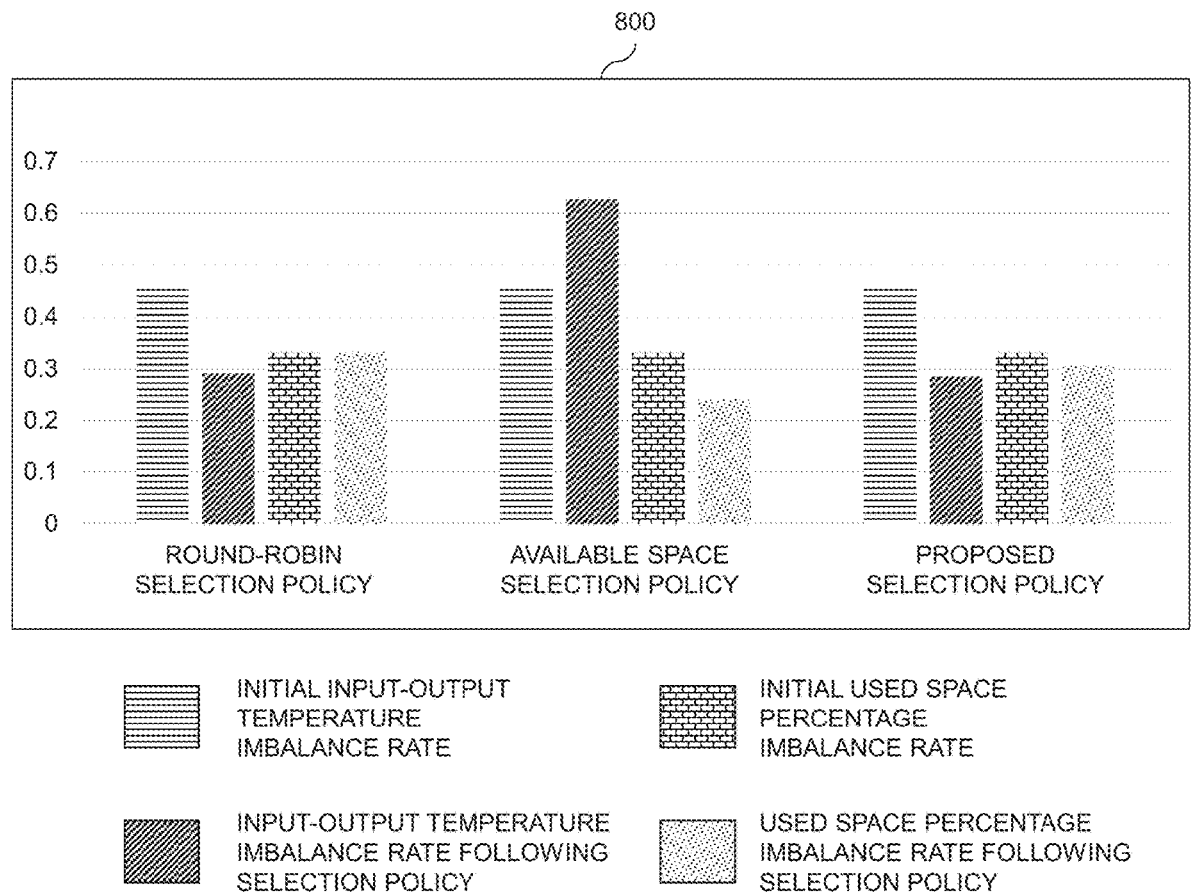
FIG. 8 shows a plot of input-output temperature and used space percentage imbalance rates using different volume selection policies in an illustrative embodiment.
Figure 9:
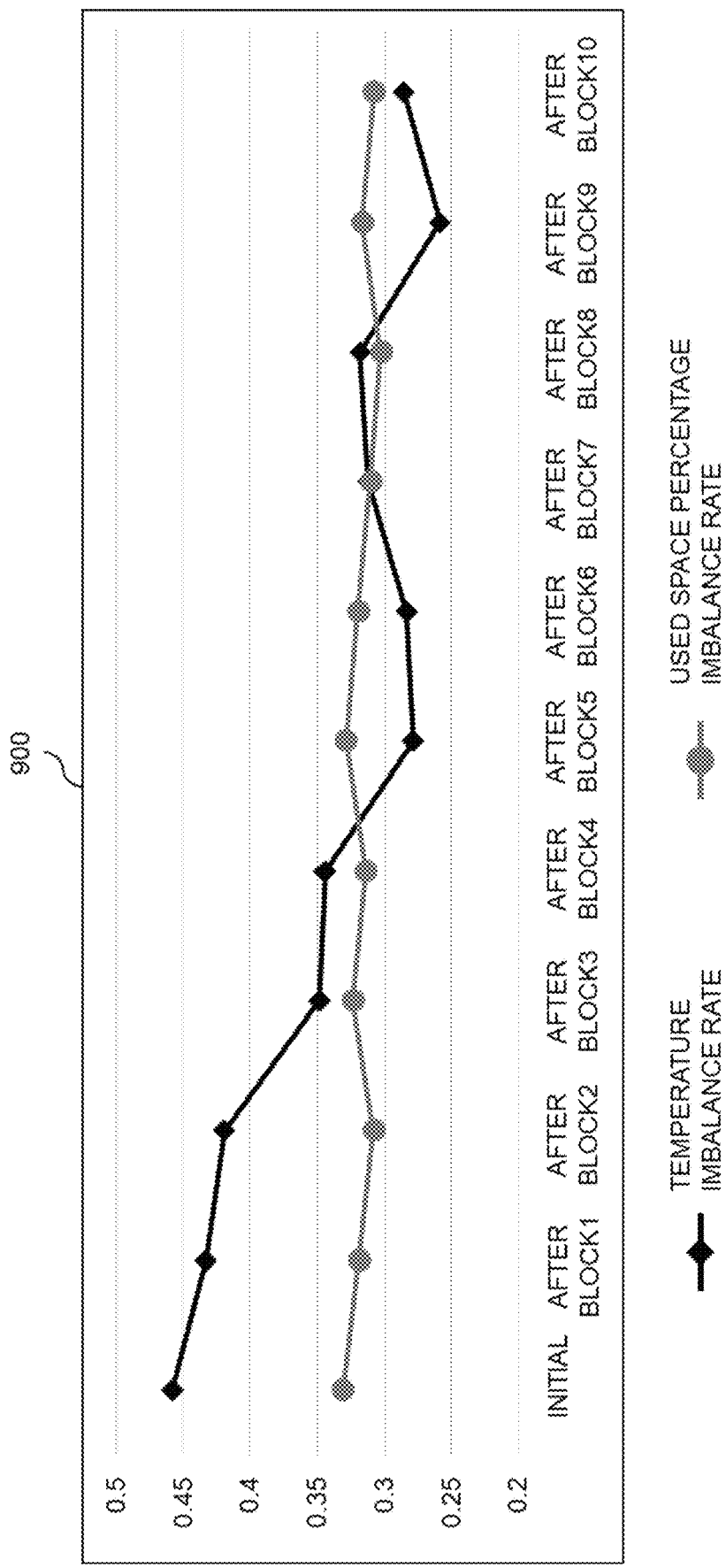
FIG. 9 shows a plot input-output temperature and used space percentage imbalance rates following placement of each data block using a selection policy that takes into account real-time input-output temperature and used space ratios in an illustrative embodiment.

FIG. 8 shows a plot 800 illustrating the imbalance rates (TIB and CIB) for the different data placement selection policies. As illustrated, the round-robin selection policy (shown in FIG. 7B) and available space selection policy (shown in FIG. 7C) do not achieve a well-balanced IO temperature and capacity for the data node 706. The optimal data placement selection policy (e.g., shown in FIG. 7D) effectively improves the equalization of block volume distributions for both the IO temperature and capacity criteria. FIG. 9 shows a plot 900 which shows the TIB and CIB values for the data node 706 after choosing the disk for each of the blocks 761. As illustrated, both TIB and CIB become smaller and smaller with each block volume choice. The particular values of $\omega_T$ and $\omega_C$ may be tuned as desired (e.g., to emphasize relative reduction of TIB and CIB).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for data placement selection among storage devices associated with nodes of a distributed file system cluster will now be described in greater detail with reference to FIGS. 10 and 11. Although described in the context of system 100, these platforms may also be used to implement at least portions of other information processing systems in other embodiments.

Figure 10:
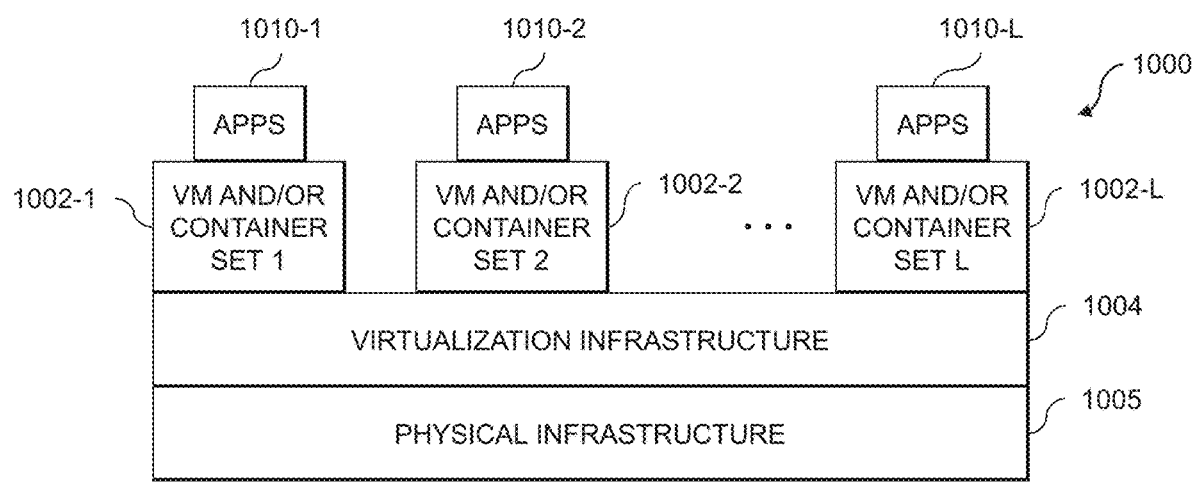
FIGS. 10 and 11 show examples of processing platforms that may be utilized to implement at least a portion of an information processing system in illustrative embodiments.
Figure 11:
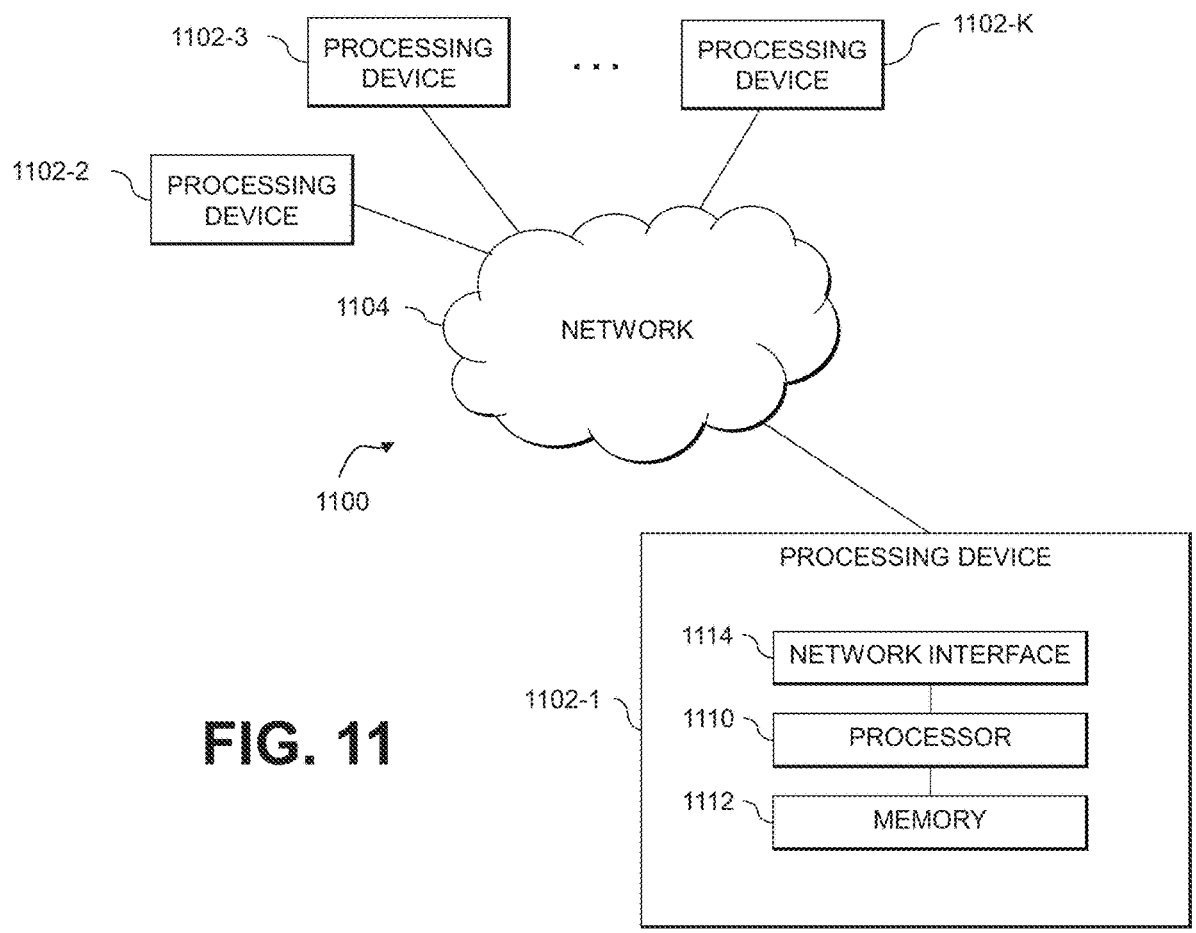

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for data placement selection among storage devices associated with nodes of a distributed file system cluster as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   receiving, at a given one of two or more nodes of a distributed file system cluster, a request to store two or more portions of data;
   monitoring, by the given node of the distributed file system cluster, two or more performance parameters for each of two or more storage devices associated with the given node, the two or more performance parameters comprising a first performance parameter characterizing data access frequency and at least a second performance parameter characterizing available space;
   determining, by the given node of the distributed file system cluster, an overall performance metric for each of the two or more storage devices associated with the given node based at least in part on the monitored two or more performance parameters;
   determining, by the given node of the distributed file system cluster, an imbalance rate associated with the given node;
   selecting, by the given node of the distributed file system cluster based at least in part on the determined overall performance metrics and the determined imbalance rate, at least a first one of the two or more storage devices associated with the given node on which to store a first one of the two or more portions of data and at least a second one of the two or more storage devices associated with the given node on which to store a second one of the two or more portions of data; and
   storing, by the given node of the distributed file system cluster, the first and second ones of the two or more portions of data on the selected first and second ones of the two or more storage devices associated with the given node.

2. The apparatus of claim 1 wherein the at least one processing device comprises a storage controller of the given node.

3. The apparatus of claim 1 wherein the distributed file system cluster comprises a Hadoop distributed file system, wherein the given node comprises a data node of the distributed file system, and wherein the request is received at the given node from an additional one of the two or more nodes of the distributed file system cluster, the additional node comprising a name node of the Hadoop distributed file system.

4. The apparatus of claim 1 wherein the two or more portions of data comprise two or more blocks of data of one or more files stored in a distributed file system of the distributed file system cluster.

5. The apparatus of claim 1 wherein monitoring the first performance parameter comprises monitoring access frequency measures for the data stored on each of the two or more storage devices associated with the given node.

6. The apparatus of claim 5 wherein a given value of the first performance parameter for a given one of the two or more storage devices associated with the given node comprises a ratio of a given one of the access frequency measures of the given storage device to a sum of the access frequency measures of the two or more storage devices associated with the given node.

7. The apparatus of claim 1 wherein monitoring the second performance parameter comprises monitoring used space percentage measures for each of the two or more storage devices associated with the given node, the used space percentage measure for a given one of the two or more storage devices comprising a ratio of a used space of the given storage device to a total space of the given storage device.

8. The apparatus of claim 7 wherein a given value of the second performance parameter for the given storage device comprises a ratio of the used space percentage measure for the given storage device to a sum of the used space percentage measures for the two or more storage devices associated with the given node.

9. The apparatus of claim 1 wherein determining a given value of the overall performance metric for a given one of the two or more storage devices associated with the node comprises computing a weighted sum of values of the two or more performance parameters for the given storage device.

10. The apparatus of claim 1 wherein the request to store the two or more portions of data comprises a request to store two or more blocks each having a designated block size.

11. The apparatus of claim 1 wherein selecting the first and second ones of the two or more storage devices associated with the given node on which to store the two or more portions of data comprises responsive to selection of the first storage device on which to store the first one of the two or more portions of data, dynamically updating the overall performance metrics for the two or more storage devices and the determined imbalance rate prior to selecting the second storage device on which to store the second one of the two or more portions of data.

12. The apparatus of claim 1 wherein selecting the first and second ones of the two or more storage devices associated with the given node on which to store the two or more portions of data is further based at least in part on reducing the determined imbalance rate associated with the given node.

13. The apparatus of claim 1 wherein determining the imbalance rate associated with the given node comprises determining a first imbalance rate characterizing differences in values of the first performance parameter for the two or more storage devices associated with the given node and determining a second imbalance rate characterizing differences values of the second performance parameter for the two or more storage devices associated with the given node, and wherein selecting the first and second ones of the two or more storage devices associated with the given node on which to store the two or more portions of data is further based at least in part on adjusting the first imbalance rate relative to the second imbalance rate in accordance with weights assigned to the first performance parameter and the second performance parameter.

14. A computer program product comprising a non-transitory processor-readable storage medium having stored therein program code of one or more software programs, wherein the program code when executed by at least one processing device causes the at least one processing device to perform steps of:

receiving, at a given one of two or more nodes of a distributed file system cluster, a request to store two or more portions of data;

monitoring, by the given node of the distributed file system cluster, two or more performance parameters for each of two or more storage devices associated with the given node, the two or more performance parameters comprising a first performance parameter characterizing data access frequency and at least a second performance parameter characterizing available space;

determining, by the given node of the distributed file system cluster, an overall performance metric for each of the two or more storage devices associated with the given node based at least in part on the monitored two or more performance parameters;

determining, by the given node of the distributed file system cluster, an imbalance rate associated with the given node;

selecting, by the given node of the distributed file system cluster based at least in part on the determined overall performance metrics and the determined imbalance rate, at least a first one of the two or more storage devices associated with the given node on which to store a first one of the two or more portions of data and at least a second one of the two or more storage devices associated with the given node on which to store a second one of the two or more portions of data; and by the given node of the distributed file system cluster, the first and second ones of the two or more portions of data on the selected first and second ones of the two or more storage devices associated with the given node.

15. The computer program product of claim 14 wherein the request to store the two or more portions of data comprises a request to store two or more blocks each having a designated block size.

16. The computer program product of claim 14 wherein determining the imbalance rate associated with the given node comprises determining a first imbalance rate characterizing differences in values of the first performance parameter for the two or more storage devices associated with the given node and determining a second imbalance rate characterizing differences in values of the second performance parameter for the two or more storage devices associated with the given node, and wherein selecting the first and second ones of the two or more storage devices associated with the given node on which to store the two or more portions of data is further based at least in part on adjusting the first imbalance rate.

17. A method comprising:

receiving, at a given one of two or more nodes of a distributed file system cluster, a request to store two or more portions of data;

monitoring, by the given node of the distributed file system cluster, two or more performance parameters for each of two or more storage devices associated with the given node, the two or more performance parameters comprising a first performance parameter characterizing data access frequency and at least a second performance parameter characterizing available space;

determining, by the given node of the distributed file system cluster, an overall performance metric for each of the two or more storage devices associated with the given node based at least in part on the monitored two or more performance parameters;

determining, by the given node of the distributed file system cluster, an imbalance rate associated with the given node;

selecting, by the given node of the distributed file system cluster based at least in part on the determined overall performance metrics and the determined imbalance rate, at least a first one of the two or more storage devices associated with the given node on which to store a first one of the two or more portions of data and at least a second one of the two or more storage devices associated with the given node on which to store a second one of the two or more portions of data; and storing, by the given node of the distributed file system cluster, the first and second ones of the two or more portions of data on the selected first and second ones of the two or more storage devices associated with the given node;

wherein the method is performed by at least one processing device comprising a processor coupled to a memory.

18. The method of claim 17 wherein the request to store the two or more portions of data comprises a request to store two or more blocks each having a designated block size.

19. The method of claim 17 wherein determining the imbalance rate associated with the given node comprises determining a first imbalance rate characterizing differences in values of the first performance parameter for the two or more storage devices associated with the given node and determining a second imbalance rate characterizing differences in values of the second performance parameter for the two or more storage devices associated with the given node, and wherein selecting the first and second ones of the two or more storage devices associated with the given node on which to store the two or more portions of data is further based at least in part on adjusting the first imbalance rate relative to the second imbalance rate.

20. The method of claim 17 wherein determining a given value of the overall performance metric for a given one of the two or more storage devices associated with the given node comprises computing a weighted sum of values of the two or more performance parameters for the given storage device.

* * * * *

UNITED STATES PATENT AND TRADEMARK OFFICE
CERTIFICATE OF CORRECTION

PATENT NO. : 12,141,105 B2
APPLICATION NO. : 17/575803
DATED : November 12, 2024
INVENTOR(S) : Huijuan Fan et al.

It is certified that error appears in the above-identified patent and that said Letters Patent is hereby corrected as shown below:

In the Claims

Claim 3, Column 17, Lines 52-53, please delete "data node of the distributed file system," and insert therefor --data node of the Hadoop distributed file system--

Claim 9, Column 18, Line 23, please delete "associated with the node" and insert therefor --associated with the given node--

Claim 13, Column 18, Lines 52-53, please delete "a second imbalance rate characterizing differences values" and insert therefor --a second imbalance rate characterizing differences in values--

Claim 14, Column 19, Line 28, please delete "by the given node" and insert therefor --storing, by the given node--

Claim 16, Column 19, Line 48, please delete "the first imbalance rate" and insert therefor --the first imbalance rate relative to the second imbalance rate--

Signed and Sealed this
Tenth Day of December, 2024

Katherine Kelly Vidal
*Director of the United States Patent and Trademark Office*